US005239961A

United States Patent [19]

Neidhard et al.

[11] Patent Number: 5,239,961

[45] Date of Patent: Aug. 31, 1993

[54] ROTARY IDLE-SPEED ACTUATOR

[75] Inventors: Klaus Neidhard, Weil der Stadt; Harald Kalippke, Benningen; Friedrich Wendel, Weissach; Erhard Renninger, Markgroeningen; Wolfgang Staudenmaier, Weinstadt; Johannes Meiwes, Markgroeningen; Albert Gerhard, Tamm; Dieter Dick, Muehlacker; Herbert Becker, Hemmingen, all of Fed. Rep. of Germany

[73] Assignee: Robert Bosch GmbH, Stuttgart, Fed. Rep. of Germany

[21] Appl. No.: 834,280

[22] PCT Filed: Aug. 3, 1990

[86] PCT No.: PCT/DE90/00593

§ 371 Date: Feb. 12, 1992

§ 102(e) Date: Feb. 12, 1992

[87] PCT Pub. No.: WO91/02893

PCT Pub. Date: Mar. 7, 1991

[30] Foreign Application Priority Data

Aug. 16, 1989 [DE] Fed. Rep. of Germany ....... 3926910

[51] Int. Cl.[5] ....................... F02M 3/00; F16K 31/04; H02K 21/22

[52] U.S. Cl. ............................... 123/339; 251/129.11; 335/272

[58] Field of Search .................. 123/339; 251/129.11; 335/272

[56] References Cited

U.S. PATENT DOCUMENTS

| | | | |
|---|---|---|---|
| 3,631,272 | 12/1971 | Kirii et al. | 310/10 |
| 4,197,489 | 4/1980 | Dunn et al. | 318/138 |
| 4,311,933 | 1/1982 | Riggs et al. | 310/156 |
| 4,339,737 | 7/1982 | Meyers et al. | 251/129.11 |
| 4,840,350 | 6/1989 | Cook | 251/129.11 |
| 4,895,344 | 1/1990 | Brand et al. | 251/129.11 |
| 4,913,114 | 4/1990 | Kalippke et al. | 123/339 |
| 4,915,074 | 4/1990 | Arai | 251/129.11 |
| 4,993,383 | 2/1991 | Wokan et al. | 123/339 |

*Primary Examiner*—Andrew M. Dolinar
*Attorney, Agent, or Firm*—Michael J. Striker

[57] ABSTRACT

A rotary idle-speed actuator for controlling a throttle cross-section in a line carrying combustion air for an internal combustion engine has an actuating motor with a stator and a rotor. The rotor is mounted on a shaft of a throttle member which more or less opens a control opening. The rotor has a cup-shaped form with a bottom and a cylinder-jacket-shaped wall. The stator has field windings and is arranged together with the field windings inside the rotor, and the stator is mounted only at its end which is opposite to the bottom of the rotor.

17 Claims, 1 Drawing Sheet

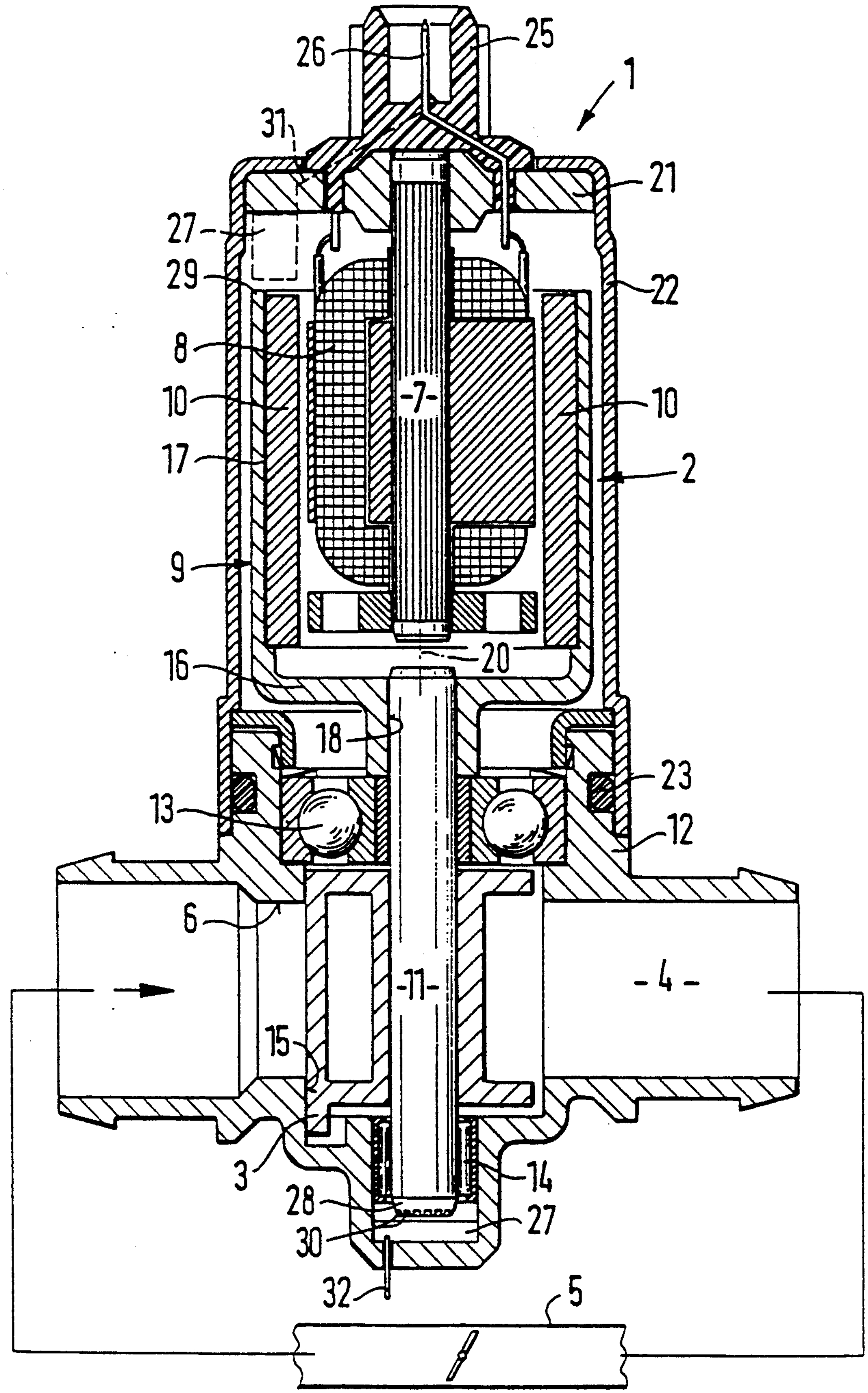
26
25
1
31
21
27
29
22
8
-7-
10
10
17
2
9
16
20
18
23
13
12
6
-11-
-4-
15
3
14
28
27
30
32
5

ROTARY IDLE-SPEED ACTUATOR

BACKGROUND OF THE INVENTION

The present invention relates to a rotary idle-speed actuator.

More particularly, it relates to a rotary idle-speed actuator for controlling a throttle cross-section in a line carrying combustion air for an internal combustion engine, which has a collectorless actuating motor with a stator fixed to a housing and a rotatable rotor mounted on a shaft of a throttle member which more or less opens a control opening. Such a rotary idle-speed actuator, the armature of which is constructed to be tubular and which has permanent magnets on its outside, is already known from DE-A 37 28 589. A stator with field windings and magnetic conductive bodies, which is firmly joined to the housing, is arranged around the rotatable armature. Overall, the structure of this rotary actuator is relatively complex.

SUMMARY OF THE INVENTION

Accordingly, it is an object of the present invention to provide a rotary idle-speed actuator which avoids the disadvantages of the prior art.

In keeping with these objects and with others which will become apparent hereinafter, one feature of the present invention resides, briefly stated, in a rotor idle-speed actuator in which the rotor of the actuating motor has a cup-shaped form with a bottom and a cylinder-jacket-shaped wall and a stator with its field windings is arranged inside the rotor, wherein the rotor is only mounted at one end with its end opposite to the bottom of the cup-shaped rotor at a housing cap.

When the rotary idle-speed actuator is designed in accordance with the present invention it has the advantage that it has a parts-saving and uncomplicated structure and is easily assembled. In addition, the entire electrical part of the actuating motor is better protected by the cup-shaped form of the rotor, for example against contamination from the pneumatic part of the rotary actuator. In addition, the attachment of sensors is facilitated since the housing parts around the large-area wall of the rotor, which is located on the outside, and around the free shaft end at the rotary slide valve offer many possibilities of attachment.

In accordance with another feature of the present invention, the rotor carries permanent magnet segments on the inside of its cylinder-jacket-shaped wall.

Still a further feature of the present invention is that the cup-shaped rotor is centrally joined to a shaft on which the throttle member of the rotary actuator is also mounted. A device or sensor for determining the rotary position of the rotary slide valve is particularly advantageous. This makes it possible to control also the idle-speed air accurately in electronically controlled combustion engines.

The sensor can be arranged opposite to the rotor or its shaft, and in particular opposite to the end of the shaft facing away from the rotor in the housing. The sensor can be also arranged opposite the free edge of the cup-shaped rotor at the housing cap. Finally, it can be arranged opposite to the cylinder-jacket-shaped wall of the rotor at the housing cap.

The sensor can scan optical or magnetic marks on the rotor or the shaft. It can also sense mechanical or electrically effective marks on the rotor of the shaft. It can determine the rotary position of the shaft and include a potentiometer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a second of a rotary idle-speed actuator in accordance with the present invention.

DESCRIPTION OF A PREFERRED EMBODIMENT

The rotary actuator 1 has an actuating motor 2 with a rotor 9 acting on a throttle member 3 which is arranged in a bypass line 4 in a housing 12. The bypass line 4 is connected at both ends to an intake pipe 5 with a throttle valve for controlling the idle-speed combustion air of an internal-combustion engine. The throttle member 3 is seated in an opening 15 of the housing 12. The opening 15 intersects the bypass line 4 and is constructed as a rotary slide valve which more or less closes a control opening 6 in the bypass line 4. The arrow specifies the direction of flow in the bypass line 4. The actuating motor 2 has the cup-shaped rotor 9 and also a central stator 7 provided with field windings 8 and arranged within the rotor 9. The rotor 9 has a disc-shaped bottom 16 and a cylinder-jacket-shaped wall 17 extending from its circumference. On the wall 17, oppositely-polarised permanent magnet segments 10 are preferably arranged. The permanent magnet segments 10 are shell-shaped and cover an angular range of about 135° each. In the bottom 16, a hole 18 is centrally arranged and accommodates a smooth shaft 11. The shaft 11 is permanently joined to the rotor 9 and supported with low friction in two bearings 13, 14, held in a housing 12. The throttle member 3 controlling the bypass line 4 is mounted on the shaft 11.

The stator 7 is mounted with its shaft 20 on a plate 21 which is arranged on a housing cap 22. The housing cap 22 covers the entire actuating motor 2 and is jointed to the housing 12 with interposition of a sealing O-ring 23. A connector attachment 25 having several connectors 26 arranged behind one another in the drawing is arranged for connecting electric lines and attached on the side opposite the stator 7. The ends of the field windings 8 are connected to the connectors 26.

The rotary idle-speed actuator 1 has a sensor 27 for determining the actual rotary position of the shaft 11. The sensor 27 can be arranged opposite to an end 28 of the shaft 11 facing away from the rotor in the housing 12 or—as is shown dashed—opposite to a free edge 29 of the wall 17. It can be also arranged at another easily accessible point at the rotor 9 or its shaft 11. In particular, any point on the housing cap 22 which is opposite the wall 17 is also suitable. For example, the housing cap 22 could be provided with a hole into which a sensor, which scans marks on the wall 17, can be inserted from the outside. The sensor 27 can be constructed as an optical, magnetic or electrical sensor and scans corresponding optical, magnetic, mechanical or electrically effective marks 30 on the rotor 9 or its shaft 11. In particular, the sensor 27 can be constructed as eddy-current sensor or as potentiometer. The optical marks can be, for example, bar codes. The electrical signals of the sensor 27 are transmitted to the outside via associated connecting lines 32 (31), for example to the connectors 26 or other connections. The signals can then be transmitted to an electronic motor control system which continuously monitors and corrects the rotary position of the throttle member.

It will be understood that each of the elements described above, or two or more together, may also find a useful application in other types of constructions differing from the types described above.

While the invention has been illustrated and described as embodied in a rotary idle-speed actuator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rotary idle-spaced actuator for controlling a throttle cross-section in a line carrying combustion air for an internal combustion engine, comprising a collectorless actuating motor with a stator having field windings, and a rotor mountable on a shaft of a throttle member which more or less opens a control opening, said rotor having a cap-shaped form with a disc-shaped bottom and a cylinder-jacket shaped wall said stator and said field winding extending substantially entirely within said cylinder-jacket shaped wall of said cap-shaped rotor and being mounted only at one end which faces away from said bottom.

2. A rotary idle-speed actuator as defined in claim 1; and further comprising a housing, said stator being fixed to said housing.

3. A rotary idle-speed actuator as defined in claim 2, wherein said housing has a housing cap, said end of said stator being mounted in said housing cap.

4. A rotary idle-speed actuator as defined in claim 1; and further comprising permanent magnets arranged on an inner side of said cylinder-jacket-shaped wall of said rotor.

5. A rotary idle-speed actuator as defined in claim 1; and further comprising a shaft on which said throttle member is mounted, said rotor being centrally joined to said shaft.

6. A rotary idle-speed actuator as defined in claim 1; and further comprising a sensor arranged opposite to said rotor so as to determine a rotary position of said throttle member.

7. A rotary idle-speed actuator as defined in claim 6, wherein said rotor is provided with a shaft on said throttle member on which said throttle member is arranged, said sensor determining a rotary position of said shaft of said rotor.

8. A rotary idle-speed actuator as defined in claim 7, wherein said shaft has an end which is opposite to said rotor, said sensor being arranged opposite to said end of said shaft.

9. A rotary idle-speed actuator as defined in claim 6, wherein said cup-shaped rotor has a free edge, said sensor being arranged opposite to said free edge of said cup-shaped rotor.

10. A rotary idle-speed actuator as defined in claim 6, wherein said sensor is arranged opposite to said cylinder-jacket-shaped wall of said rotor.

11. A rotary idle-speed actuator as defined in claim 7; and further comprising means forming marks on at least one of said rotor and said shaft, said sensor being formed so as to scan said marks.

12. A rotary idle-speed actuator as defined in claim 11, wherein said marks are formed as optical marks.

13. A rotary idle-speed actuator as defined in claim 11, wherein said marks are formed as magnetic marks.

14. A rotary idle-speed actuator as defined in claim 11, wherein said marks are formed as mechanical marks.

15. A rotary idle-speed actuator as defined in claim 11, wherein said marks are formed as electrical marks.

16. A rotary idle-speed actuator as defined in claim 6, wherein said sensor includes a potentiometer.

17. A rotary idle-speed actuator for controlling a throttle cross-section in a line carrying combustion air for an internal combustion engine, comprising a collectorless actuating motor with a stator having field windings, and a rotor mountable on a shaft of a throttle member which more or less opens a control opening, said rotor having a cap-shaped form with a disc-shaped bottom and a cylinder-jacket shaped wall extending away from said throttle member, said stator and said field winding extending toward said throttle member in said cylinder-jacket shaped wall of said cap-shaped rotor and being mounted only at one end which faces away from said bottom.

* * * * *